Dec. 16, 1969 M. FEINBERG 3,484,051

COMPUTER TAPE TRANSPORT

Filed April 26, 1967 4 Sheets-Sheet 1

INVENTOR
MAURICE FEINBERG
BY

Blair Buckles Cesari & St. Onge
ATTORNEYS

INVENTOR
MAURICE FEINBERG
BY
Blair Buckles Cesari & St. Onge
ATTORNEYS

COMPUTER TAPE TRANSPORT

Filed April 26, 1967 4 Sheets-Sheet 3

INVENTOR
MAURICE FEINBERG
BY
Blair Buckles Cesari & St. Onge
ATTORNEYS

Dec. 16, 1969 M. FEINBERG 3,484,051

COMPUTER TAPE TRANSPORT

Filed April 26, 1967 4 Sheets-Sheet 4

INVENTOR.
MAURICE FEINBERG
BY
Blair Buckles Cesari & St. Onge
ATTORNEYS

United States Patent Office 3,484,051

Patented Dec. 16, 1969

3,484,051

COMPUTER TAPE TRANSPORT

Maurice Feinberg, 536 Clinton Road, Brookline, Mass.

Filed Apr. 26, 1967, Ser. No. 633,737
Int. Cl. B65h 17/48; G11b 5/00
U.S. Cl. 242—55.19 16 Claims

ABSTRACT OF THE DISCLOSURE

A tape transport pays out and rereels an endless coil of tape which is supported on edge by a rotary plate. Tape is pulled from the coil through a stationary guide positioned above the plate and rewound on the outside of the coil at a rate tending to rotate the coil at a first speed. The plate is, in turn, rotated in the same direction at a second speed greater than the first.

BACKGROUND OF THE INVENTION

Field of the invention

This invention relates to a tape transport for use with a data processing system. It relates more particularly to apparatus for paying out and rereeling an endless coil of tape through a computer tape reader. Even when left unattended, it recycles continuously through the reader as needed to meet the demands of the particular computer program.

The present tape transport may be used with any conventional data processing system which stores information on some form of tape. It has particular application, however, in connection with systems found in offices, plants and the like utilizing punched tape data storage. In these systems, the tape is fed through a punched tape reader which controls an electric typewriter. As the tape advances through the reader, the data thereon is printed out by the typewriter. Due to limitations of tape width and system versatility, a typical installation may require sixy feet or more of punched tape to store parts inventory data for even a relatively small plant. Moreover, in order to print out a complete inventory list from the punched tape, an operator must feed the tape through the tape reader as many as thirty times.

Description of the prior art

In prior systems, no reliable provision is made for the orderly feeding and retrieval of this tape. Surprisingly enough, the practice up to now has been for the operator to arrange the tape in a neat pile on the floor or desk beside the reader and feed the beginning of a tape into the reader. Then, as the program proceeds, the tape exiting the reader falls into another pile on or under the operator's desk. Consequently, it becomes twisted, torn and tangled with all of the obvious consequences.

It should be mentioned at this point that punched tape is frequently fabricated from very inexpensive paper. It bends, cracks and tears quite easily. The many holes punched in the tape weaken it even further. In many of these systems, if the tape breaks and the system is not stopped immediately the data printed out thereafter is unintelligible and the program must be started again from the beginning. Needless to say, then, these conventionally fed punched tape systems undergo a considerable amount of down-time, the net effect of which is to incerase their overall cost to the users.

In a typical system, a sixty foot long tape may advance through the reader in approximately fifteen minutes. This means that the completion of an inventory list requiring thirty passes of the tape through the reader consumes almost eight hours. If a reliable tape transport is not available, an operator must be in attendance during all this time to untangle the tape, repair cracks and tears therein and recycle it through the reader. As a practical matter, to avoid paying overtime rates, the user runs his inventory processing during normal business hours when the system could be used to greater advantage doing less routine programs. Such inefficient usage raises costs still further.

It has been proposed to solve the aforementioned problems by forming the tape into an endless coil and paying it out and rereeling it for the tape reader. There are in existence a variety of devices for doing this with motion picture film, plastic tape and the like. However, these prior tape feeders do not perform satisfactorily with the rather flimsy and fragile punched paper tape with which are primarily concerned here. They twist and tension the tape so that it tends to tear. Also, at times, chocking of the tape occurs because the feeder does not adapt itself quickly enough to the change in tape speed during the different operational modes of the reader. In short, these prior film and tape feeders cannot be relied upon to correctly pay out and rereel punched paper tape for any appreciable period of time. As a practical matter, an operator must still be present to oversee their operation.

SUMMARY OF THE INVENTION

This invention aims to provide an improved tape transport which is capable of automatically and reliably paying out and rereeling punched paper tape.

Another object of this invention is to provide an improved tape transport which feeds tape to and retrieves it from a reader over a wide range of tape speeds.

A further object of the invention is to provide an improved taye transport which can feed and retrieve tape at high speed without tangling or tearing the tape.

Another object of this invention is to provide apparatus for feeding tape to and retrieving it from a computer tape reader which can run unattended and be relied on to shut off at the end of the program or in the event of certain malfunctions in the system.

Another object of the invention is to provide a tape transport which apprises the user of the status of the particular program being run at any given time.

A still further object of the invention is to provide apparatus for paying out and rereeling an endless coil of tape which is compatible with most data processing systems storing data on a tape.

Another object of this invention is to provide an improved tape transport which is relatively inexpensive to make.

A still further object of the invention is to provide a tape transport which can accommodate a wide range of tape widths and lengths.

Another object of this invention is to provide an improved tape transport which is compact, portable and easily accommodated on a conventional office desk.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

Briefly, the transport comprises a rotary turntable for supporting an endless coil of tape. The tape rests on edge freely on the turntable and a long tape loop extending out from the inside of the coil is fed through a conventional tape reader. In the case of a punched tape system, the reader has a driven sprocket wheel which engages corresponding sprocket holes along the tape and pulls the tape from the inside of the coil as that rotates. After leaving the reader, the tape is rewound on the outside of the coil. The transport feeds the tape from the turntable to the reader by way of guides, suspended above the turntable, which remain stationary as the turntable and tape coil rotate.

More particularly, a guide ramp is positioned just above the turntable near the center thereof. The ramp is inclined generally in the direction of rotation of the table and frictionally engages the tape. The tape at the very inside of the coil is constrained to slide up the ramp by means of a guide post positioned above the turntable adjacent the bottom of the ramp. Another guide member at the top of the ramp reroutes the tape to the reader.

The turntable is rotated at an appreciable speed and has a low friction bearing surface engaging the tape coil which allows the two to slide relative to one another. The tape reader pulls tape from the inside of the coil up the ramp and away from the turntable. This tends to offset the coil on the turntable until the side thereof remote from the guide post engages a hub thereon. Also, the coil rotates about its axis at a slower speed than that of the turntable. The coil speed depends on the rate at which the tape rewinds on the outside of the coil. This, in turn, depends on the speed of the tape through the reader during its search and read modes of operation. Thus, in effect, the coil of tape "floats" on the rapidly rotating turntable, thereby maintaining constant tension on the tape leading to and from the reader despite variations in the rate at which the tape advances through the reader.

While the new tape is being pulled around the guide post, up the ramp, and away from the coil, the coil proper is maintained in its offset position on the turntable away from the guide post and ramp. It remains loosely seated on the turntable and free to rotate. The net result is that even at the faster tape speeds, the tape is fed and retrieved smoothly and reliably with minimum tendency to twist, tighten up or chock.

The present tape transport also has provision for automatically controlling the data processing equipment with which it is associated. More particularly, a timer automatically shuts off the entire system upon completion of the program. In addition, the transport responds to a power failure or break in the tape by shutting off the system so that erroneous data is not printed out for the remainder of the planned period of operation.

The transport also includes a magnetic reading head which reads out data printed on the tape in magnetic ink. This information may be descriptive of the programming steps being performed by the system at that moment or it may warn the operator in advance of a step which he is due to perform. In any case, the transport gives an audible indication of the current status of the program being processed by the system.

Provision is also made for connecting the transport to a conventional phone system so that the user can tell whether the system is still in operation or is stopped simply by dialing his phone number. If the system is off when it should not be, the user knows that a malfunction has occurred. He can then take the appropriate corrective steps immediately and so minimize the down time of the system.

Thus, my improved transport is sufficiently reliable that it can be left completely unattended to feed tape for a very long program. It can handle a wide range of tape widths and lengths with equal facility. While it is particularly suited for the more fragile paper tapes, it can, of course, accommodate the stronger plastic tapes now available.

DESCRIPTION OF THE DRAWINGS

For a fuller understanding of the nature and objects of the invention, reference should be had to the following detailed description taken in connection with the accompanying drawings, in which.

DESCRIPTION OF THE PREFERRED EMBODIMENT

Figure 1:
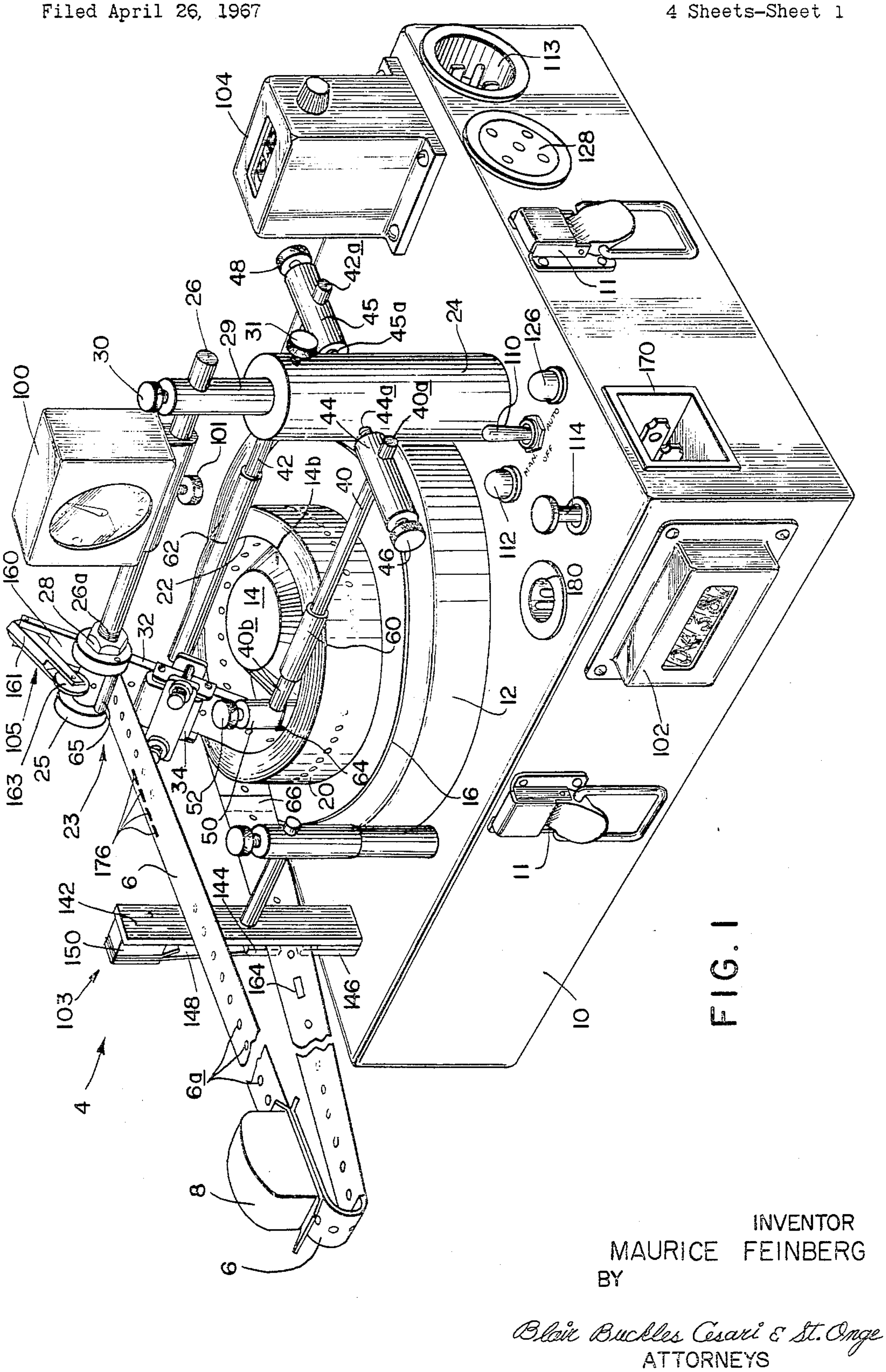
FIG. 1 is a perspective view of an improved tape transport for paying out and rereeling an endless coil of tape.
Figures 3, 4:
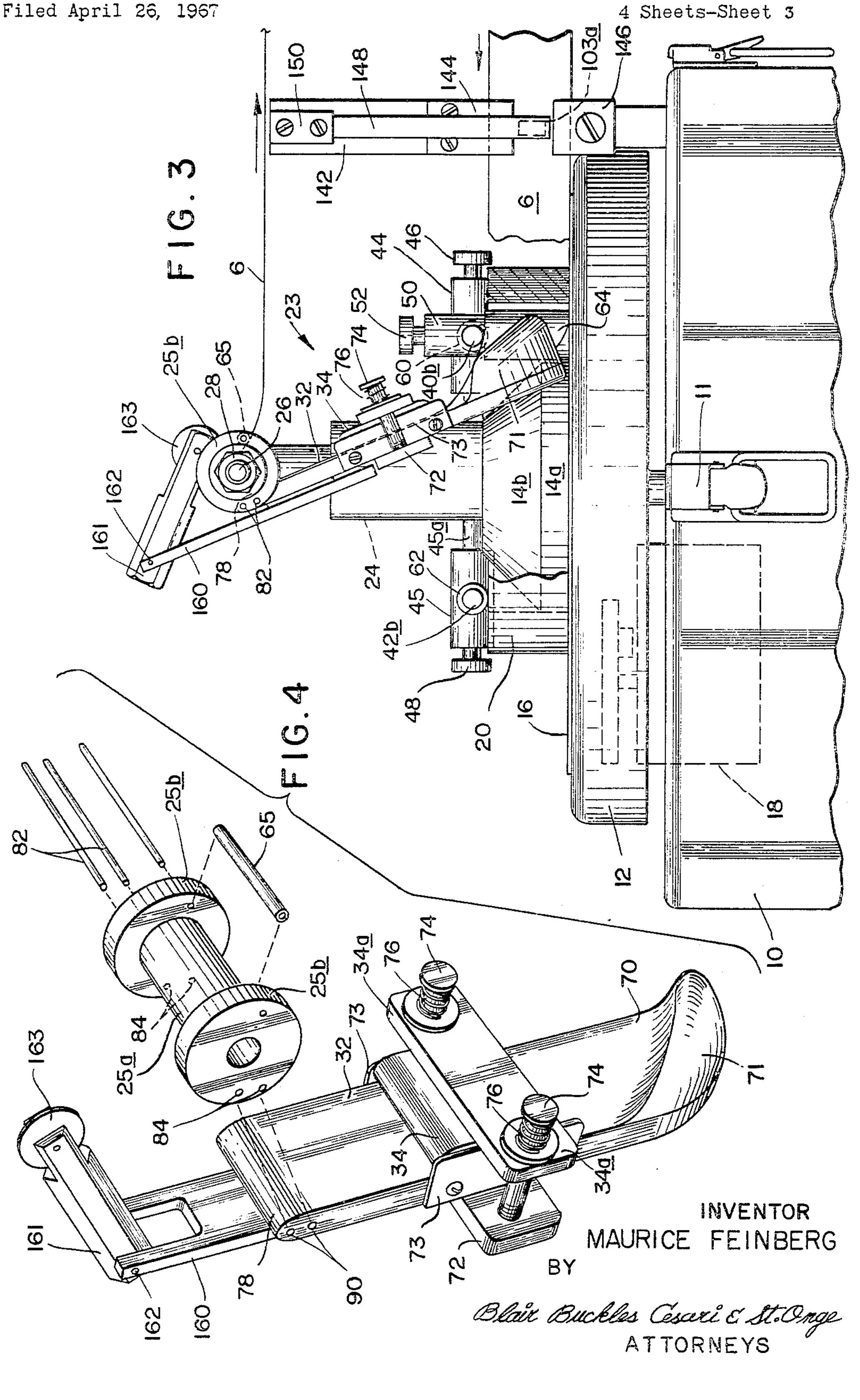
FIG. 3 is a side view thereof with parts broken away.
FIG. 4 is an enlarged exploded perspective view of a portion thereof.

Referring now to FIGS. 1 and 3 of the drawings, the tape transport is indicated generally at 4. It is shown paying out punched tape 6 to and rereeling it from a conventional tape reader 8. The transport per se comprises a box-like base 10 which contains various electrical components of the system to be described later. A cover (not shown) is adapted to engage over base 10 and fully enclose the transport. The cover may be secured in place by locks 11 on base 10.

A circular turntable 12 is rotatively supported on base 10. Turntable 12 is fitted with an upstanding central hub 14 having a short cylindrical lower section 14*a* (FIG. 3) of relatively large diameter and an integral frustoconical upper section 14*b*. The overall height of hub 14 is slightly less than the width of tape 6. Turntable 12 also has a low friction top surface in the form of a very thin disc 16 of polytetrafluoroethylene or other similar material noted for its low coefficient of friction. A conventional electric motor 18 (FIG. 3) contained within base 10 rotates turntable 12.

A coil 20 of punched paper tape is positioned on turntable 12 about hub 14. The coil 20 has a central opening 22 whose diameter is considerably larger than that of the hub 14. A 4 inch coil I.D. is typical. A long loop of tape 6 extends out from the coil 20 to reader 8. The reader advances the tape 6 by means of an internal sprocket wheel (not shown) which engages in corresponding sprocket holes 6*a* in the tape. When the tape advances, a stationary guide assembly indicated generally at 23, suspended above the turntable 12, conducts the tape smoothly and gradually from the inside of coil 20 and toward the reader in a manner to be described. Upon its return from the reader, the tape 6 is rereeled on the outside of coil 20.

Turntable 12 is rotated clockwise at a fairly high speed. Reader 8 pulls tape 6 from the inside of coil 20 and feeds it back for rewinding on the outside of the coil at a rate which only permits coil 20 to rotate at an appreciably slower speed than that of turntable 12. Consequently, coil 20 slides or "floats" on turntable 12. Rotation of coil 20 urges tape 6 to ride up ramp 32, but only to a degree commensurate with the rate of retrieval of tape 6 on the outside of the coil. In this way, tape 6 is maintained under substantially constant tension despite changes in the tape feed rate during the different modes of operation of reader 8. There is minimum tendency for the coil 20 to tighten up or for the tape to become chocked due to a differential in the rates at which the tape is payed out and rereeled by the transport.

Guide assembly 23 is supported by a relatively large diameter upstanding post 24 mounted on base 10 adjacent turntable 12. It includes a spool-like guide member 25 mounted on a reduced diameter threaded end 26*a* of a rod 26 and held in place by nuts 28. The other end of rod 26 is slidably received in a fixture 29 extending down into a bore in post 24. A set screw 30 screwed down into the back of post 24 clamps the fixture 29 to the post.

An elongated guide ramp 32 is suspended from guide member 25 above turntable 12. The top of ramp 32 is spaced from member 25 and the ramp extends down to a point just above the surface of the turntable. Also, the ramp is inclined upward generally in the direction of rotation thereof. In other words, it is inclined so that it makes an obtuse angle with the advancing surface of the rotating turntable so that the tape is in position to ride up the ramp and around member 25. A plate 34 is positioned above and biased downward against the top so as to act as a drag on the tape as that is pulled up the ramp out of coil 20. Plate 34, as well as the ramp 32 and its securement spool 25, will be dealt with in detail later in connection with FIG. 4.

Guide assembly 23 also includes a pair of arms 40 and 42 supported by post 24 so as to extend out over turntable 12 on opposite sides of hub 14. Normally, these arms engage the top of tape coil 20 to prevent lengths of tape 6 from riding up out of the coil as that rotates. Arms 40 and 42 are supported as follows. Their ends **40*a* and 42*a* are slidably received through horizontal rods 44 and 45 respectively. Rods 44 and 45 have reduced diameter threaded ends 44*a* and 45*a* respectively screwed into the opposite sides of post 24 and they are free to rotate somewhat about their own longitudinal axes. Similar set screws 46 and 48 screwed into the opposite ends of rods 44 and 45 engage arms 40 and 42** to hold them in selected positions of adjustment.

An upstanding guide post 50 is suspended above turntable 12 adjacent the bottom of ramp 32 to smoothly conduct tape 6 from the inside of coil 20 onto the ramp. Guide post 50 is slidably received on the end **40*b* of arm 40 over turntable 12 and is held in the proper position by a set screw 52. Arms 40 and 42 as well as post 50 are provided with low friction bearing surfaces in the form of sleeves 60, 62 and 64** respectively. These sleeves are preferably made of polytetrafluoroethylene or other such plastic having a low coefficient of friction. The purpose of the sleeves is to provide low friction bearing surfaces over which the tape freely slides.

When placing coil 20 on turntable 12 initially, ramp 32 is swung up out of the way. Arms 40 and 42 are also lifted up with the rods 44 and 45 acting as pivots. Rods 44 and 45 are spaced up from base 10 by a distance approximately equal to the width of the tape. Thus, when arms 40 and 42 are returned to their normal horizontal positions shown in FIG. 1, their sleeves 60 and 62 engage the top of coil 20. The length of the guide post 50 below arm 40 is less than the width of the tape (e.g. one inch) so that there is appreciable clearance between post 50 and turntable 12 when the arms 40 and 42 are in their normal positions.

The end of tape 6 inside coil 20 is then unraveled and led around guide post 50, being twisted 90°, and then fed up ramp 32 between the ramp and the overlying plate 34. Tape 6 is then led between member 25 and ramp 32 and back over member 25. Finally, it is then led under a retainer 65 mounted on member 25 and pulled by hand to reader 8. After the tape is fed through the reader, it is looped back to the transport 4 where it is spliced at 66 to the other end of the tape at the outside of coil 20.

Figure 2:
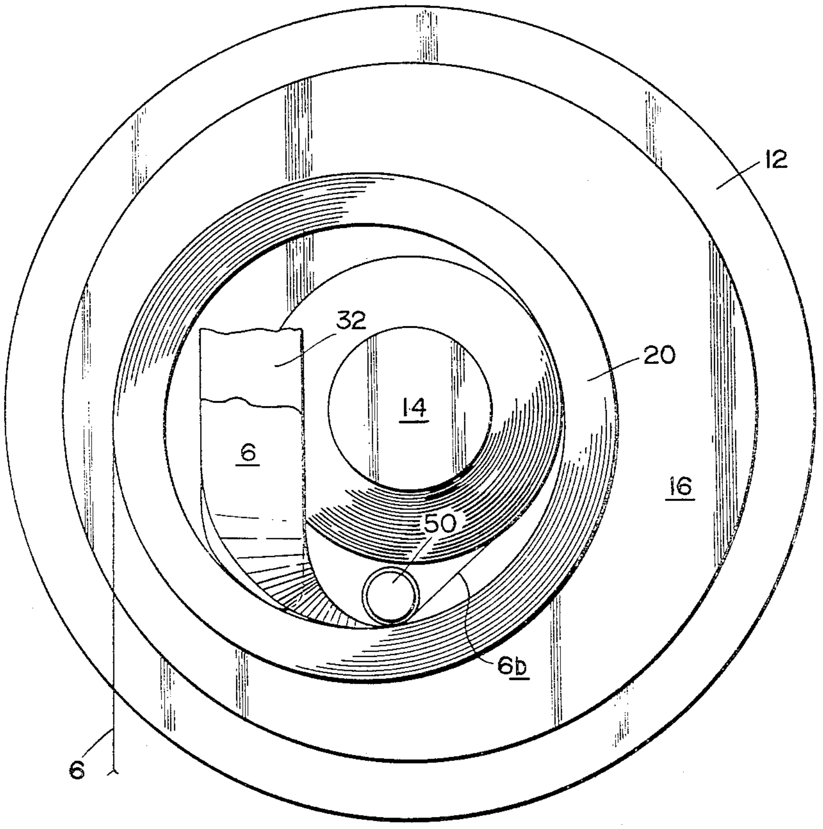
FIG. 2 is a schematic diagram showing the path of the tape therein.

Referring now to FIGS. 1 and 2, the arm 40 is adjusted on rod 44 so that guide post 50 probes against the length of tape 6 at the inside of coil 20 when the opposite inner side of the coil engages hub 14. More particularly, the length of tape **6*b* (FIG. 2) passing around guide post 50 is pulled away from the remainder of the coil into a generally straight segment. This tends to minimize the tendency of the coil to wind up on hub 14** and become jammed.

The adjustment of post 50 depends primarily upon the size of coil 20 (i.e. the size of the central opening through the coil). More specifically, post 50 is adjusted so that as the tape 6 passes around it on the way to ramp 32, a gentle 90° clockwise twist is imparted to the tape. Thus, by the time the tape reaches ramp 32, it lies flat against the surface of the ramp.

Referring to FIG. 4, the lower end 70 of the ramp 32 tapers almost to a point and carries a contoured shoe 71 to smoothly guide the tape onto the ramp. Resultantly, a smooth path is presented to the tape; there are no sharp edges or projections that might tend to tear the tape by catching in the perforations **6*a*** therein.

The plate 34 resiliently engaging tape 6 on ramp 32 has side extending ears **34*a* overhanging ramp 32. A plate 72 is brazed to the underside of ramp 32. Also, a pair of plates 73 are screwed to the opposite sides of ramp 32 to laterally contain tape 6 and plate 34. The two plates 34 and 72 are secured together by means of screws 74 extending through suitable openings in ears 34*a* on each side of ramp 32 and screwed into plate 72. Coil springs 76 are interposed between plate 34 and the heads of screws 74 to resiliently bias the plate 34 toward ramp 32. The plate acts as a drag on the tape passing up the ramp and prevents the tape from spilling over. This, in turn, insures that the tape is pulled from coil 20 only to meet the demands of reader 8. The plate 34 should be able to give enough the splice 66, comprising a double thickness of tape, to pass up the ramp under the plate 34**.

The top surface of ramp 32 is also beveled at its upper end 78 to remove any edges from the vicinity of the tape. It also enables the ramp 32 to be closely spaced from stem **25*a* of spool 25**.

Referring now to FIGS. 3 and 4, the ramp 32 is suspended from spool 25 by means of a pair of pins 82 received in side openings 84 in spool flanges **25*b* and extending through registering side openings 90 at the top of ramp 32. When loading the transport initially as described above, one of the pins 82 is slid out. The ramp 32 is then swung up away from turntable 12. The pins and holes are arranged so that normally the ramp makes an angle of about 25°–35° from the vertical. This angle is fairly critical in a given application in that if it is too steep, the tape does not feed properly up the ramp. On the other hand, if the angle is too shallow, neither the ramp itself nor the tape segment 6*b* being pulled from coil 20 will clear the remainder of the coil. When the tape leaves the ramp 32, it engages around the stem 25*a* of spool 25, passes under retainer 65 on spool 25, and extends toward reader 8** as described previously.

In some applications, the tape 6 may proceed directly from the ramp to the reader 8 and hence the spool 25 may be eliminated. In either case, one should take care to avoid making a Moebius strip when effecting the splice 66.

Referring again to FIGS. 1 and 2, in operation, turntable 12 is rotated at a relatively high rate, about 80 r.p.m. Coil 20 tends to rotate with turntable 12, but its rotation is restrained by the engagement of tape 6 by reader 8. That is, tape 6 feeds through the reader at a rate depending upon whether the reader is operating in its search or read mode. In the former case, the tape feeds at approximately 10.5 feet per minute, which is equivalent to about 8 r.p.m. of coil 20. In the latter case, the tape feeds at about 6.5 r.p.m., which is equivalent to a coil 20 rotation rate of about 5 r.p.m. In any event, turntable 12 turns much faster than the allowable rate of rotation of coil 20, usually in the order of 10–20 times faster. This speed differential causes coil 20 to slip relative to turntable 12. The low friciton bearing surface 16 interposed between the tape and the turntable helps in this respect. Thus, tape coil 20, in effect, "floats" on turntable 12. It turns enough to permit tape segment **6*b* at the inside of the coil to feed up ramp 32 without jamming or chocking and to maintain the tape 6 spanning between reader 8 and coil 20** fairly taut.

At the same time, the rates at which the tape 6 is paid out and rereeled by the transport are kept equal and the tension on tape 6 is kept constant despite changes in the rate at which the tape feeds through reader 8 during its search and read modes of operation. This insures that coil 20 does not wind up on turntable 12 to the extent that it becomes so tight that it jams. In other words, the diameter of the inside opening 22 in coil 20 remains substantially constant during the operation of the transport.

Transport 4 is provided with various timing and control elements which enable it to operate automatically and unattended. These include a timer 100 slidably mounted on rod 26 and adjustably secured there by a set screw 101, a time totalizer 102 mounted on the side of base 10, a tape break switch indicated generally at 103, a cycle counter 104 mounted on base 10 and its control switch indicated generally at 105 secured to ramp 32. These control elements will be described in more detail later in connection with FIG. 5.

Referring now to FIGS. 1 to 5, the mode of operation of tape transport 4 is controlled by means of a double throw switch 110 mounted in base 10. When switch 110 is in the MANUAL position, turntable motor 18 (FIG. 3) and an associated red pilot light 112 in base 10 are connected directly to an A.C. power source by way of a recessed male plug 113. In this mode, the transport operates independently of the reader 8 and the rest of the data processing system.

Transport is also able to run automatically by positioning switch 110 in the AUTOMATIC position and then depressing button 114 mounted in base 10. This closes a pair of relay contacts 120*a* and 120*b*. The closing of the former contact energizes motor 18 (FIG. 3) by connecting it directly to plug 113. The closing of the latter contact couples power from plug 113 via switch 110 and a normally closed relay contact 122*a* to a relay coil 120 which controls the contacts 120*a* and 120*b*. The energizing of coil 120 holds the associated relay contacts closed as long as current flows in that coil. However, if power from plug 113 fails, or if relay contact 122*a* opens for reasons that will be dealt with presently, current no longer flows in coil 120 and hence contacts 120*a* and 120*b* open, shutting off the system.

The closing of relay contact 120*b* also energizes a relay coil 124 which then closes an associated contact 124*a*. The closing of this contact 124*a*, in turn, energizes a green pilot light 126 mounted in base 10 which signals that transport 4 is operating in its AUTOMATIC mode. It also energizes a receptacle 128 mounted on the side of base 10 to which the main power line of the associated data processing system is connected. The contacts in receptacle 128, which carry current when the system is operating in this mode, are recessed so that there is no chance of someone receiving a shock by touching them. Thus, in the AUTOMATIC mode, the operation of the computer is tied to that of the transport.

The closing of contact 124*a* also starts a timer 100. The timer is set for a time somewhat longer than the estimated computer program time. Then, at the appointed time, timer 100 shuts off the transport as will be described presently. The closing of contact 124*a* also starts time totalizer 102 which maintains a running total of the time the system has run in its AUTOMATIC mode. Thus, when the transport is leased, a cover slotted for passage of the tape may be locked over the transport and a true record of the rental period obtained by noting the beginning and ending times on totalizer 102. Finally, the closing of contacts 124*a* energizes the primary winding 132 of a step-down transformer 134. The transformer secondary winding 136 is connected to relay coil 122 by way of a contact 100*a* in timer 100 and a contact 103*a* in a tape break switch 103.

Switch 103 is mounted on base 10 adjacent turntable 12. Its purpose is to shut off transport 4 and the associated system in the event of a break in tape 6. Without some protection of this kind, the tape would not be rereeled after it advanced through the reader 8 and would accumulate in a pile under the reader. As best seen in FIG. 3, the switch 103 is supported by a rod 140 adjustably mounted in a post 141 secured to base 10. Switch 103 comprises a conductive plate 142 to which are attached upper and lower insulated tape guides 144 and 146. Plate 142 is one terminal of the switch. A long, resilient, spring-like member 148 is secured at one end via insulator 150 to plate 142. The switch contact 103*a* is a roller secured to the other end of member 148 which rides on the incoming tape 6 as it passes between guides 144 and 146. Normally, the intervening insulating tape holds contact 103*a* open, i.e. holds the roller away from plate 142. However, if the tape breaks, as soon as the free end thereof exits switch 103, the contact 103*a* engages plate 142 and the switch is closed.

The closing of either switch 103 or timer contact 100*a* energizes relay coil 122. This opens the associated contact 122*a* and deenergizes coil 120. This, in turn, opens contacts 120*a* and 120*b*, shutting off the system.

Thus, as seen from the foregoing, if the tape 6 breaks, or if there is a power failure, and also at the end of the programmed period of operation, the transport not only shuts itself off, but also shuts off the associated computer connected at receptacle 128. Moreover, an operator must again depress button 114 before the system will restart. This prevents the printing out of erroneous data when power is reestablished.

Figure 5:
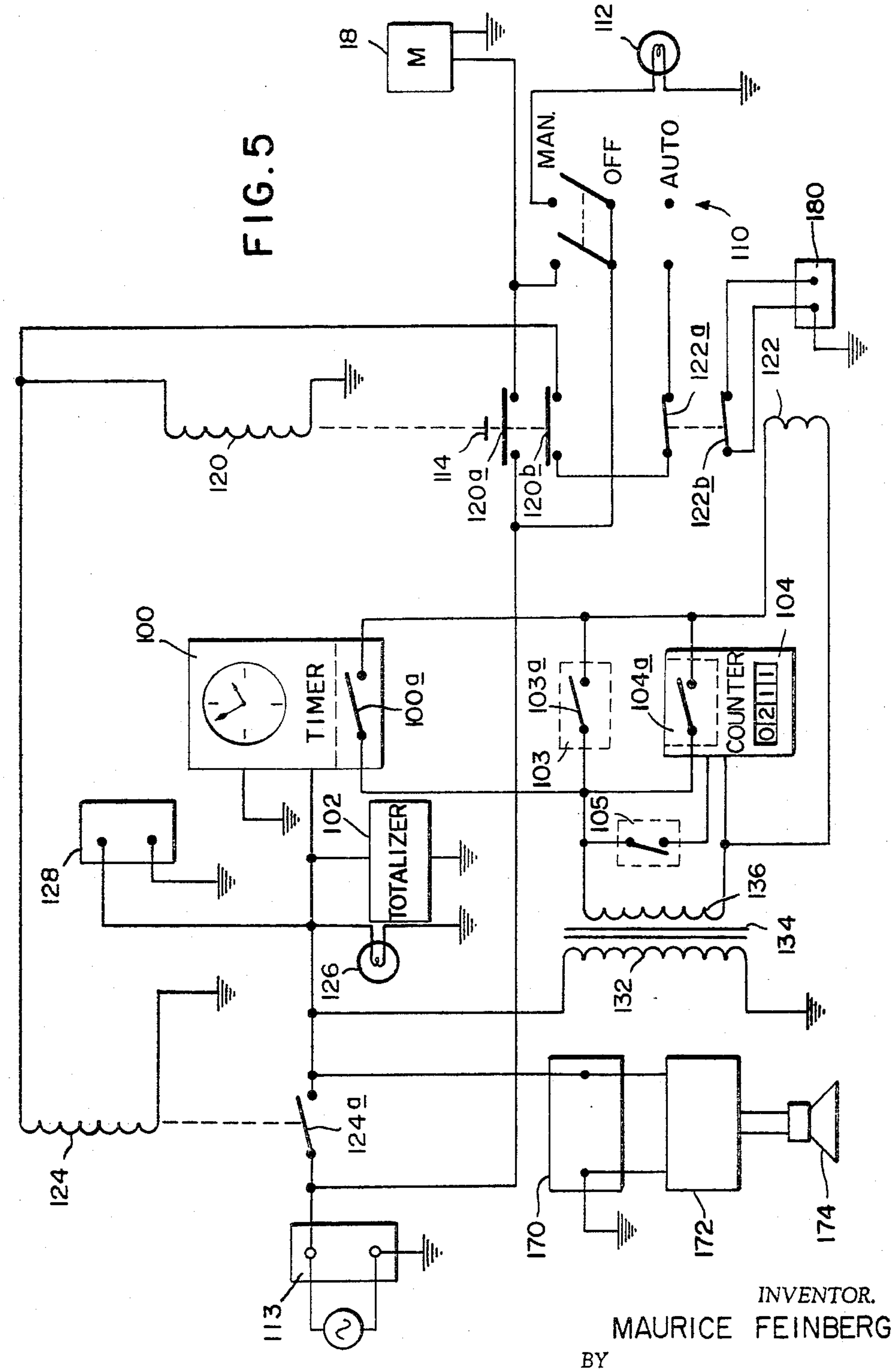
FIG. 5 is a schematic diagram of the electrical system thereof.

Referring to FIGS. 1, 4 and 5, in certain applications it is desirable to keep track of the number of passes tape 6 has made through the reader 8 during a given program. In this way, the operator can know at any time how the program is proceeding. The counter 104 yields this information. Counter 104 is connected to transformer winding 136 through the switch 105.

Switch 105 comprises a bifurcated conducting plate 160 brazed to the rear face of ramp 32 and extending up above the ramp. A bifurcated conducting arm 161 is swingably connected to plate 160 by a pin 162. A thin conducting wheel 163 rotatively mounted at the other end of arm 161 engages over stem 25*a* of member 25. Stem 25*a* and wheel 163 are the terminals of the switch. Tape 6 feeds between wheel 163 and stem 25*a* on its way to reader 8. Normally, then, wheel 163 is insulated from stem 25*a* by tape 6 and so switch 105 is open as seen in FIG. 5. However, an opening 164 (FIG. 1) is made in tape 6 at the end point of the data thereon, i.e. just before splice 66. Opening 164 is large enough so that when that portion of tape 6 passes under wheel 163, the wheel is free to engage stem 25*a* through opening 164 completing the circuit and closing switch 105. Each time switch 105 closes, it energizes counter 104, causing it to decrease its count by one number. Thus, if at the beginning of the program the operator sets counter 104 to a number corresponding to the number of tape passes in the program to be processed, when counter 104 reaches zero, the end of the program is at hand. Counter 104 then closes a switch 104*a* therein which, in turn, energizes relay coil 122 and shuts off the system as described above. When counter 104 is included in the transport, the timer 100 functions as a backup shut-off device.

Figure 6:
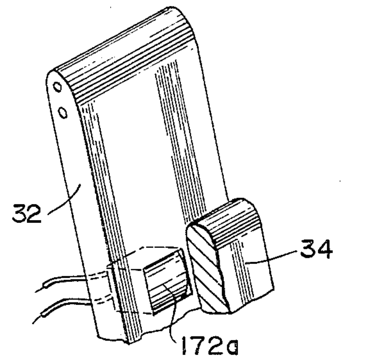
FIG. 6 is a fragmentary perspective view with parts broken away of a portion thereof.

Referring to FIGS. 1 and 5, an outlet 180 is provided in base 10. Its two terminals are connected to ground and to plug 113 when contact 124*a* is closed. Thus, outlet 170 is energized when the system is operating in its AUTOMATIC mode. By means of outlet 170, connection may be made to a remote magnetic playback unit 172 having a loudspeaker 174 both of which are shown in FIG. 5. Unit 172 is adapted to detect magnetic markings 176 (FIG. 1) printed on tape 6. Markings 176 may be simply dashes which cause unit 172 to emit an audible series of beeps via its speaker 174 to signal the user in advance to perform certain steps required in the processing of the particular program. The markings 176 may also make up a voice track which actually tells the user what to do. This is highly desirable when training new people to use the transport and the associated data processing equipment. The magnetic read head 172*a* for unit 172 can be recessed conveniently into ramp 32 as shown in FIG. 6 at a suitable position under plate 34 to engage markings 176.

The present transport also provides for monitoring the operation of the entire system from a remote location. More particularly, and still referring to FIGS. 1 and 5, an outlet 180 is mounted in base 10 adjacent button 114. Outlet 180 has two terminals which are short circuited by the closing of a relay contact **122*b* which operates in coincidence with contact 122*a*. Also, one terminal of outlet 180 is connected to ground as shown. Outlet 180 is adapted to be connected to two wires of the ringing circuit of a conventional household telephone, with the ground wire of that circuit being connected to the grounded terminal of outlet 180**.

When transport 4 is operating properly in its AUTOMATIC mode, relay contact **122*b* is closed and so the ringing circuit of the associated telephone connected thereto is short-circuited. This means that if the user dials the telephone number corresponding to this ringing circuit from any location, he will get a busy signal as long as transport 4 is operating properly. However, if the system malfunctions due, for example, to a break in tape 6, the relay contact 122*b*** opens. Now, when the user dials the telephone number, the bell at that location will ring signaling him that the transport is stopped. As long as he knows the expected duration of the particular program he is processing, he can tell immediately whether the system has malfunctioned and whether it has shut off properly at the end of the programmed period of operation. He is then in a position to take immediate steps to minimize the down time of the system.

It is apparent from the foregoing that the present transport feeds even flimsy paper tapes smoothly and reliably for long periods of time. As the tape is being paid out and rereeled at the different speeds required by the reader, its tension is carefully controlled to minimize the likelihood of its tearing or chocking. Furthermore, no one need be present during operation of the transport. When the particular program is completed, the transport automatically shuts off the entire data processing system. Finally, the transport emits audible signals at its situs and to remote locations connected by telephone by which the user can ascertain that it is operating properly.

It will thus be seen that the objects set forth above, among those made apparent from the preceding description, are efficiently attained and, since certain changes may be made in the above article without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention described herein, and all statements of the scope of the invention which, as a matter of language, might be said to fall therebetween.

Having described my invention, what I claim as new and desire to secure by Letters Patent is:

1. An improved tape transport for paying out and rereeling and endless coil of tape, said transport comprising (A) a rotary plate (12) for supporting said coil on edge;

(B) a centrally located hub (14) projecting from said plate, around which said coil loosely seats;

(C) a bearing surface on said plate for engaging said coil of tape so as to allow the coil to slip relative to the plate;

(D) a stationary tape guide means (23) positioned above said plate;

(E) means (8) for pulling tape from the inside of said coil around said guide means and feeding it back to the outside of said coil at a selected rate tending to rotate said coil in one direction at a first speed; and (F) means for rotating said plate in the same direction at a second speed which is appreciably greater than said first speed, the ratio of said second speed to said first speed exceeding 5:1.

2. An improved tape transport as defined in claim 1 wherein said tape guide means includes (A) a stationary ramp (32) for supporting and guiding said tape on the way from said plate to said pulling means, said ramp being positioned above and declining toward said plate;

(B) drag member (34) overlying said ramp; and (C) means (76) for biasing said member toward said ramp so as to resiliently engage said tape as it is pulled up said ramp away from said plate by said pulling means.

3. An improved tape transport as defined in claim 2 wherein said tape guide means further includes (A) a vertical guide post (50) positioned just above said plate relatively near the bottom of said ramp inside said coil, said tape passing around said post on its way from said coil to said ramp; and (B) a substantially horizontal guide bar (**25*a***) positioned adjacent to the top of same ramp over which said tape passes on its way to said pulling means.

4. An improved tape transport as defined in claim 3 wherein said means for rotating said plate includes (A) an electric motor (18) arranged and adapted to drive said plate; and (B) a timer (100) which controls said motor.

5. An improved tape transport as defined in claim 4 wherein said timer is also connected to control said pulling means so that said plate and said pulling means operate together.

6. An improved tape transport for paying out and rereeling an endless coil of tape, said transport comprising (A) a rotary surface (12) supporting said coil (20) of tape on edge;

(B) means (18) for rotating said surface;

(C) a ramp (32)

(1) positioned just above said surface; and (2) guiding said tape portion away from said surface, said ramp inclining generally in the direction of surface rotation;

(D) an upstanding post (50)

(1) positioned just above said surface adjacent the bottom of said ramp inside said coil; and (2) guiding said tape portions from said coil onto said ramp;

(E) means (8) for pulling said tape portions from the inside of said coil and feeding it back to the outside of said coil at a rate tending to rotate said coil at a first speed; and (F) wherein said surface rotating means rotates said surface in the same direction at a second speed, the ratio of said second speed to said first speed exceeding 5:1.

7. An improved tape transport as defined in claim 6 wherein said guide means includes also clamp means (34) positioned adjacent to and biased toward said ramp so as to place a drag on said tape.

8. An improved tape transport as defined in claim 6 wherein said surface has a low coefficient of friction coating (16).

9. An improved tape transport as defined in claim 8 and further including means (40, 42) positioned above said surface for holding said coil down on said surface, said holding means having low-friction bearing surfaces (60, 62) engaging said coil of tape.

10. An improved tape transport as defined in claim 6 and further including (A) a timer (100) connected to automatically control said surface rotating means and said pulling means; and (B) switch means (103) responsive to breaks in said tape for de-energizing said surface rotating means and said pulling means.

11. An improved tape transport as defined in claim 10 and further including means (103) responsive to breaks in said tape for de-energizing said surface rotating means.

12. An improved tape transport for paying out and re-reeling an endless coil of tape comprising
(A) a generally horizontal base (10);
(B) a turntable (12) including a hub (14) rotatively mounted on said base;
(C) an electric motor (18) for rotating said turntable in one direction at a selected first speed;
(D) a timer connected to control said motor;
(E) a bearing member (25) positioned over said turntable;
(F) a tape guide ramp (32)
(1) declining from said bearing member toward said turntable; and
(2) terminating at a point just above said turntable;
(G) a plate (34) biased toward the top surface of said ramp;
(H) a first arm (40)
(1) supported from one end by said base; and
(2) extending out over said turntable on one side of said hub;
(I) an upright guide post (50)
(1) adjustably positioned at the other end of said first arm; and
(2) spaced just above said turntable adjacent the bottom of said ramp;
(J) a second arm (42);
(1) adjustably supported from one end by said base; and
(2) extending out over said turntable on the other side of said hub from said first arm;
(K) a switch (103)
(1) responsive to breaks in said tape;
(2) connected to control said motor.

13. An improved tape transport as defined in claim 12 wherein said turntable and said first and second arms have low-friction bearing surfaces (60, 62) of engaging said tape.

14. An improved tape transport as defined in claim 12 and further including
(A) a coil (20) of tape arranged on edge on said turntable around said hub, said coil of tape having a relatively long tape loop extending out from the inside and outside of said coil away from said turntable, the tape extending from the inside of said coil being threaded around said bearing post and between said ramp and said plate and around said bearing means and the tape extending from the outside of said coil being threaded through said switch; and
(B) means (8) positioned in said tape loop for pulling tape from the inside of said coil.

15. An improved tape transport as defined in claim 12 and further including
(A) a counter; and
(B) means responsive to indicia on the tape for advancing the count of said counter upon each complete cycle of the tape through the transport.

16. An improved tape transport as defined in claim 12 and further including
(A) means responsive to coded indicia on the tape for generating a control signal during operation of said transport; and
(B) means responsive to said control signal for generating an audible signal to alert the operator.

References Cited

UNITED STATES PATENTS

| | | | |
|---|---|---|---|
| 2,363,627 | 11/1944 | Van Der Schalie | 242—55.19 |
| 2,426,838 | 9/1947 | Miller | 242—55.19 XR |
| 2,496,103 | 1/1950 | Neufeld. | |
| 2,875,667 | 3/1959 | Chedister. | |
| 3,228,619 | 1/1966 | Hardin | 242—55.19 |
| 3,287,508 | 11/1966 | Morrison. | |
| 3,311,316 | 3/1967 | Williams. | |

FOREIGN PATENTS

| | | |
|---|---|---|
| 340,002 | 8/1921 | Germany. |

BILLY S. TAYLOR, Primary Examiner

U.S. Cl. X.R.

179—100.2